(12) United States Patent
Serena et al.

(10) Patent No.: US 10,850,813 B2
(45) Date of Patent: Dec. 1, 2020

(54) SUPPORTING SYSTEM FOR A FLOATING VESSEL IN SHALLOW OR VERY SHALLOW WATER

(71) Applicant: SAIPEM S.p.A., Milan (IT)

(72) Inventors: Alberto Serena, Milan (IT); Diego Lazzarin, Milan (IT); Olivier Fresnet, Milan (IT)

(73) Assignee: SAIPEM S.p.A., Milan (IT)

( * ) Notice: Subject to any disclaimer, the term of this patent is extended or adjusted under 35 U.S.C. 154(b) by 0 days.

(21) Appl. No.: 15/544,833

(22) PCT Filed: Jan. 7, 2016

(86) PCT No.: PCT/IB2016/050063
§ 371 (c)(1),
(2) Date: Jul. 19, 2017

(87) PCT Pub. No.: WO2016/116824
PCT Pub. Date: Jul. 28, 2016

(65) Prior Publication Data
US 2018/0001976 A1    Jan. 4, 2018

(30) Foreign Application Priority Data
Jan. 20, 2015  (IT) .............................. MI2015A0044

(51) Int. Cl.
*B63B 35/44*        (2006.01)
*G05D 1/02*         (2020.01)
(Continued)

(52) U.S. Cl.
CPC ........ *B63B 35/4413* (2013.01); *B63B 21/502* (2013.01); *B63B 35/44* (2013.01);
(Continued)

(58) Field of Classification Search
CPC ....... B63B 17/00; B63B 21/50; B63B 21/502; B63B 35/44; B63B 39/00; B63B 39/04;
(Continued)

(56) References Cited

U.S. PATENT DOCUMENTS

| 4,156,577 A | 5/1979 | McMakin |
| 4,380,406 A | 4/1983 | Ayers |

(Continued)

FOREIGN PATENT DOCUMENTS

| GB | 1 199 360 A | 7/1970 |
| KR | 10-1270905 B1 | 6/2013 |

OTHER PUBLICATIONS

International Search Report and Written Opinion of the International Searching Authority for corresponding International Patent Application No. PCT/IB2016/050063 dated May 3, 2016, 9 pages.

*Primary Examiner* — Daniel V Venne
(74) *Attorney, Agent, or Firm* — Merchant & Gould P.C.

(57) ABSTRACT

A supporting system for a floating unit in shallow water exerts controlled stresses on the floating unit hull and includes supporting structure for the hull. An extendable supporting device operatively connects to the supporting structure and is suitable to support a predetermined weight of the floating unit and load when entirely supported by the extendable supporting device and when the extendable supporting device rests on a bed of a water body. An actuator device connects to the supporting structure and operatively connects to the extendable supporting device for extension or contraction. A control device operatively connects to the actuator device to control the extraction or contraction movement of the extendable supporting device. The system includes at least one hull stress monitoring device operatively connected to the control device. A device to monitor (Continued)

the stress, or load, on the extendable supporting device operatively connects to the control device.

14 Claims, 8 Drawing Sheets

(51) Int. Cl.
      *G05D 1/08*            (2006.01)
      *G01M 5/00*           (2006.01)
      *B63B 21/50*          (2006.01)
      *E02B 17/02*          (2006.01)

(52) U.S. Cl.
      CPC ........ *G01M 5/0041* (2013.01); *G01M 5/0058* (2013.01); *G05D 1/0206* (2013.01); *G05D 1/0875* (2013.01); *E02B 17/021* (2013.01)

(58) Field of Classification Search
      CPC ............ B63B 2017/00; B63B 2021/50; B63B 2021/502; B63B 2035/44; B63B 2039/00; B63B 2735/00; E02B 17/021; E02B 2017/0056; E02B 17/00; E02B 17/08; G05D 1/0206; G01M 5/0041; G01M 5/00; G08B 21/00
      USPC .................. 114/44, 256, 294, 295, 264–267; 405/197, 198; 340/665; 73/786
See application file for complete search history.

(56) References Cited

U.S. PATENT DOCUMENTS

| | | | | |
|---|---|---|---|---|
| 5,855,455 | A * | 1/1999 | Williford | .............. E02B 17/021 |
| | | | | 114/265 |
| 6,196,767 | B1 * | 3/2001 | Thomas | ................ E02B 17/021 |
| | | | | 114/264 |
| 8,336,388 | B2 * | 12/2012 | Lenders | .................... G01L 3/02 |
| | | | | 73/786 |
| 8,471,396 | B2 * | 6/2013 | Roddier | ................ B63B 35/44 |
| | | | | 290/44 |
| 9,388,545 | B1 * | 7/2016 | Wolner | .................... E02B 3/068 |
| 9,580,150 | B2 * | 2/2017 | Lee | ........................ B63B 9/001 |
| 2006/0062637 | A1 | 3/2006 | Foo et al. | |
| 2008/0247827 | A1 | 10/2008 | Altman et al. | |
| 2012/0050056 | A1 | 3/2012 | Lenders et al. | |

* cited by examiner

SUPPORTING SYSTEM FOR A FLOATING VESSEL IN SHALLOW OR VERY SHALLOW WATER

This application is a National Stage Application of PCT/IB2016/050063, filed 7 Jan. 2016, which claims benefit of Serial No. MI2015A000044, filed 20 Jan. 2015 in Italy and which applications are incorporated herein by reference. To the extent appropriate, a claim of priority is made to each of the above disclosed applications.

FIELD OF THE INVENTION

The present invention relates to a supporting system for floating vessels.

In particular, the present invention relates to a supporting system for a floating vessel and to a floating vessel suitable for shallow or very shallow water, e.g. water even only a few meters deep, typically strongly influenced by very high tide excursions.

Even more particularly, the present invention also relates to a method for supporting floating vessels on the bed of a water body, e.g. the sea bottom or the river bed, as well as a servicing method of a supporting system for floating vessels and also a method for reconfiguring floating vessels.

BACKGROUND ART

One of the most critical conditions for the dimensioning of a barge working in shallow water, where a high tide excursion is additionally possible, is dictated by the possibility that the barge may need to be in the condition of having to rest the hull on the sea bottom or the river bed.

In order to prevent damage to the hull, in addition to suitable designing of the hull itself, which is not always easy or even feasible in the case of existing floating vessels, it is important to prepare the sea bottom in advance, e.g. to remove roughness and guarantee suitable planarity, thus avoiding localized damage to the bottom of the hull or global deformations to the structure of the floating vessel itself.

Very often, in order to avoid these undesired drawbacks, it is envisaged to rest the floating vessel, e.g. a barge, exclusively on low bearing capacity bottoms so as to distribute the weight and the load of the barge uniformly on the bottom of the hull itself.

In all cases, if the barge rests with its hull on the bottom or bed, the hull must be locally strengthened by proceeding on a case-by-case basis according to the morphology and the properties of the terrain, e.g. according to planarity, yielding, presence of rocks and to guarantee a distribution of the load, in uniform manner on the entire structure of the barge. It is thus apparent that designing a new hull or modifying an existing hull will vary from application to application, thus making the reuse of the application means on different bottoms unlikely.

Floating vessels of this type are known for example from document GB1199360.

These known solutions are very disadvantageous both for the time needed to prepare the bottom or bed and for the environmental impact on large areas of the sea bottom, as well as for the need to make robust hulls which are complex and costly to manage, maintain and govern. However, this remains the only solution possible today if existing floating vessels are used, in particular barges with large or very large longitudinal and transverse extension of the deck.

In different situations, e.g. in the case of deep water, it is known to use vessels, specifically platforms, provided with legs moveable in height and capable of supporting the entire weight of the platform itself as a whole raising it from the surface of the water. In these known solutions, instead of resting the hull uniformly on the bottom, e.g. the sea bottom, the hull is rested on legs, thus following possible deviations of the planarity of the local yielding of bottom itself in this manner.

These known solutions are mainly used for offshore drilling (jack-up) and for the construction of jetties. In these cases, the vessel is completely raised from the water to be independent from the weather and sea conditions and remain stable during all processing operations.

In order to avoid planarity problems of the deck, the number of legs must be usually limited to three so to have substantially isostatic structures, capable of guaranteeing system stability during installation and during working operations.

These known legs are particularly invasive structures which greatly encumber the deck, thus heavily influencing the useful load arrangement design and the working operations of the platform itself.

The legs are generally actuated by means of electric motors provided with pinion engaged in a rack integral with the legs of the means. Such a movement allows to control the movements and the planarity of the floating structure during the step of resting the legs of the bottom. The bearing capacity of the means is mainly due to the driving of the legs into the terrain of the bottom itself, operating as true foundations poles with penetration of even several meters into the bottom.

A solution of this type is known from document U.S. Pat. No. 8,336,388 by National Oilwell Varco. This known solution suggests to control the actuation of a single leg so as to avoid problems of instability, such as peak loads of the structure of the leg itself, which is naturally long to be able to work in deep waters (even tens of meters deep).

Similar solutions are known from US 2006/0062637 by OFFSHORE TECHNOLOGY DEV. PTE LT, which again relates to controlled movement solutions to avoid instability of the single leg, and from KR101270905B1.

In all cases, these known solutions do not guarantee that the stresses in the hull, by overcoming the resistance limits thereof, above all in cases in which the required deck surface is particularly broad, do not cause a localized permanent formation or a twisting of the entire structure, in particular if applied to barges of considerable longitudinal and transverse dimensions, e.g. of length in the order of about one hundred meters and width of tens of meters.

Thus, the need is strongly felt for a supporting system for a floating vessel in shallow or very shallow water which allows to avoid the preparation of the bed or bottom of the water body and which at the same time avoids the need to re-engineer the structure of the hull to limit its deformation in case of localized supports which are borrowed from offshore perforation platform solutions.

Equally, it is strongly felt the need to make a solution which allows to rest a barge on a bottom or bed of a water body generally a few meters deep, in stable manner also in case of resting on non-uniform terrain, avoiding the need to excessively strengthen the floating vessel and thus make it heavier.

Indeed, both the solution of resting the entire hull of the barge on the bottom or bed of the water body and the solution of resting the hull of the floating vessel on legs so as to make it come out of the water as a traditional jack-up is today unsuitable to limit the deformation of the structure of the hull itself.

Solution

It is the object of the present invention to devise and make available a system and a method which allow to solve the drawbacks described above.

In addition to the other advantages which will be described in greater detail below, the suggested solutions allow to obtain a supporting system on the bottom or bed provided, among other advantages, with a control of the force which establishes the load to be applied to each extendable support as a function of the limit stress which can be applied to the hull structure, thus allowing to obtain light hull structures and which can be easily suitable to different types of bottom having non-uniform local supporting features.

The suggested solution is particularly suitable for hulls of large transverse and longitudinal breadth, such as barges which require a high number of supporting legs making the supported structure isostatic.

Furthermore, the suggested solution allows to redistribute the weight of the barge on several supporting points, configured as surface foundation, thus distancing the bottom of the barge from the bed of the water body. By virtue of the suggested solution it is not necessary for the barge to come out of the water, possibly also relying on the residual thrust on the immersed part to reduce the load and the stresses on the structure of the vessel itself.

FIGURES

Further features and advantages of the system and method according to the invention will be apparent from the description provided below of preferred embodiments thereof, given by way of non-limiting example, with reference to the accompanying drawings, in which.

DESCRIPTION OF SOME PREFERRED EMBODIMENTS

Figure 1:
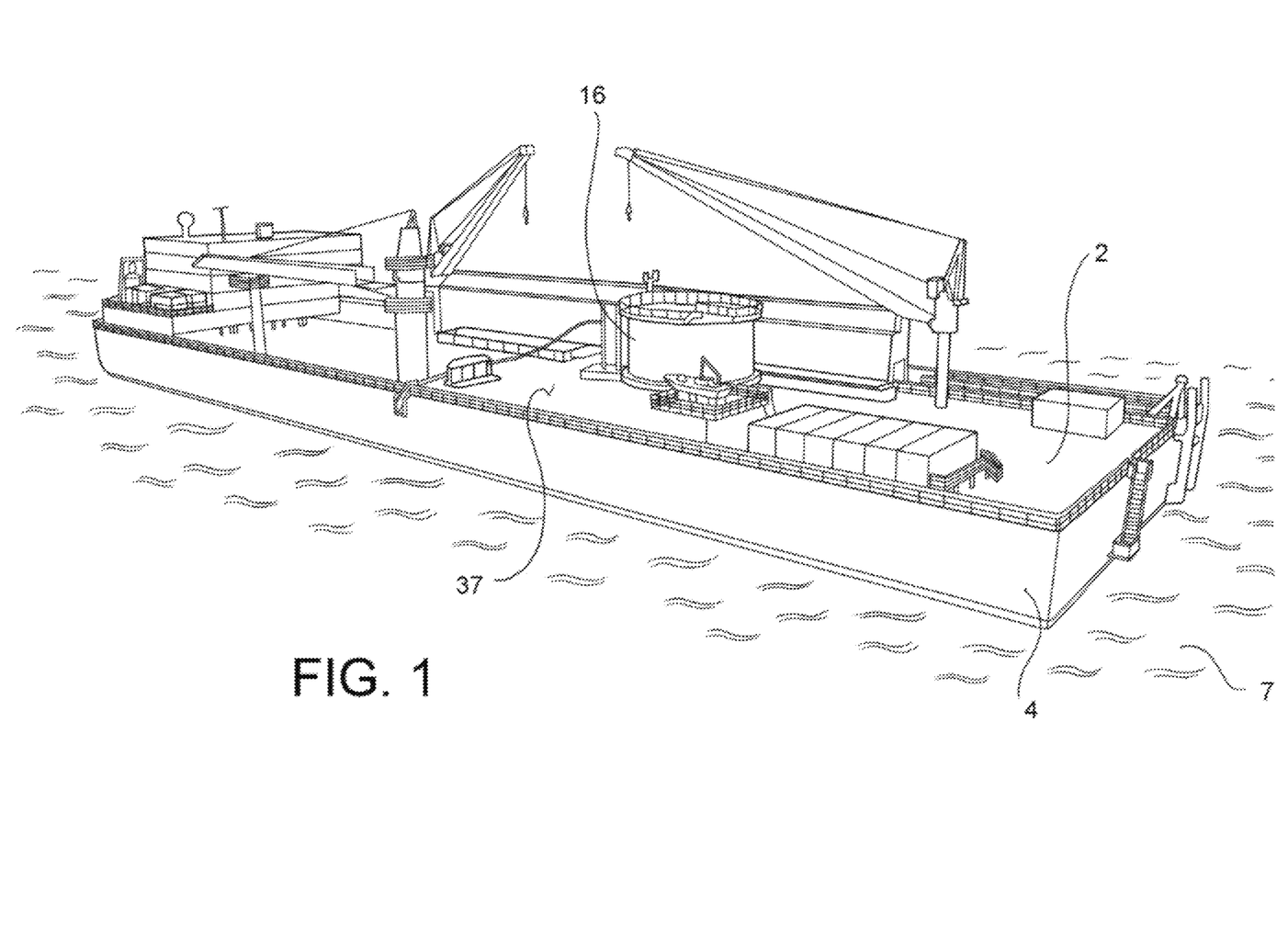
FIG. 1 shows a perspective view of a lay barge floating on a water body.
Figure 2:
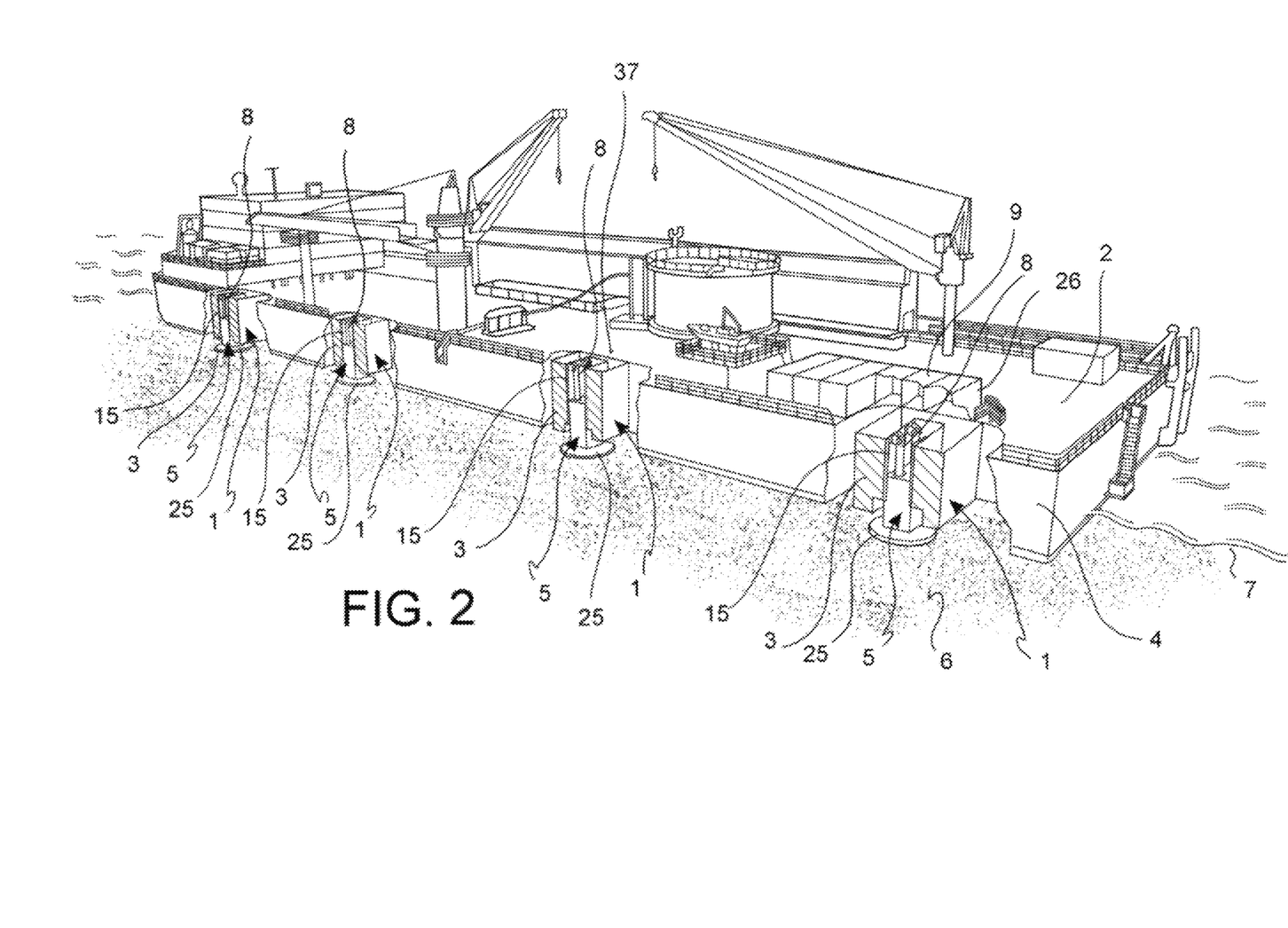
FIG. 2 shows a partial section view of the barge in FIG. 1, in which the sections show some parts of the supporting system partially extended and resting on the sea bottom.
Figure 3:
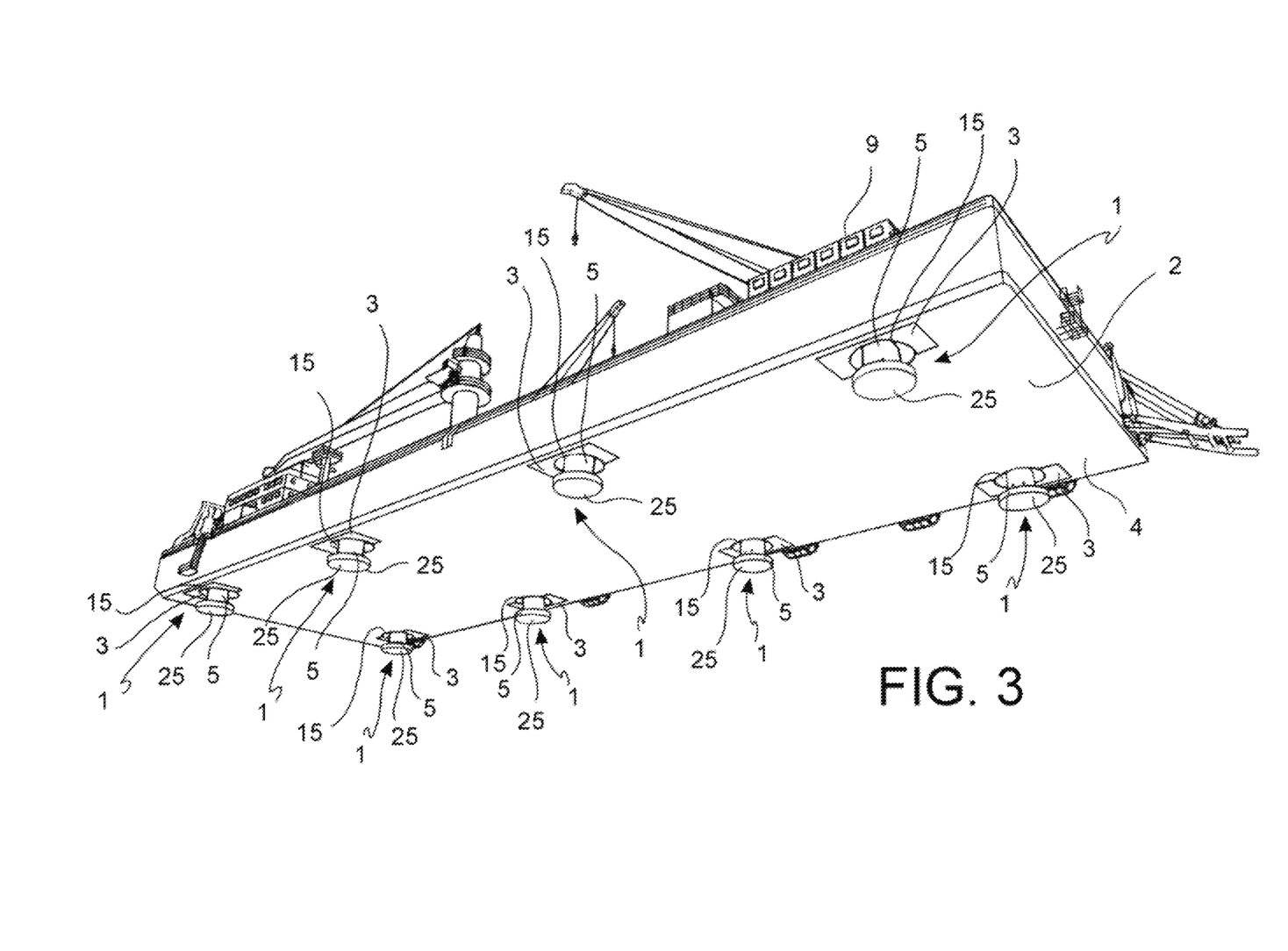
FIG. 3 shows a perspective view from the bottom of the barge in FIG. 2 having the supporting system partially extended.
Figure 4:
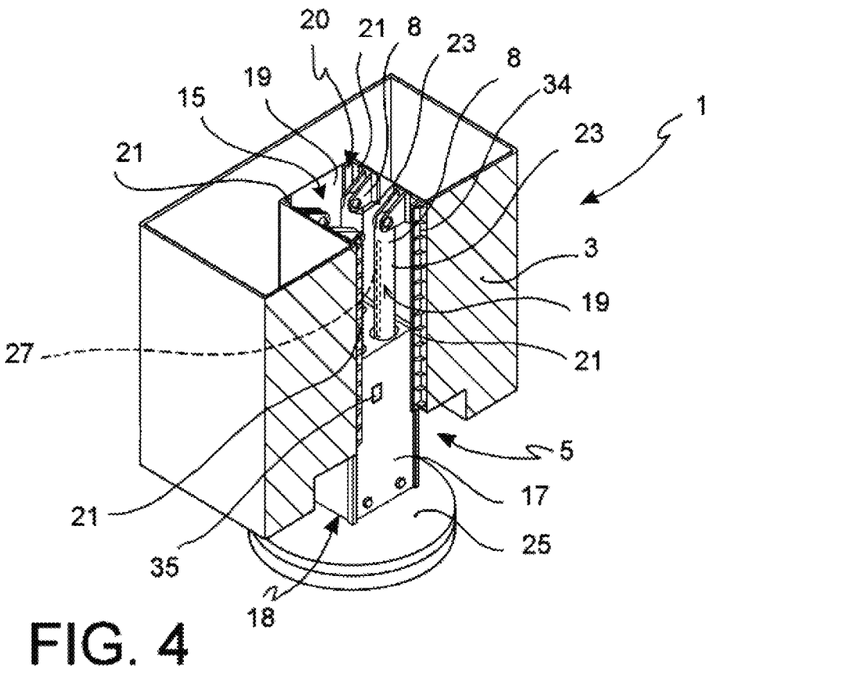
FIG. 4 shows an axonometric, partial section view of an extendable support in partially extended position.
Figure 5:
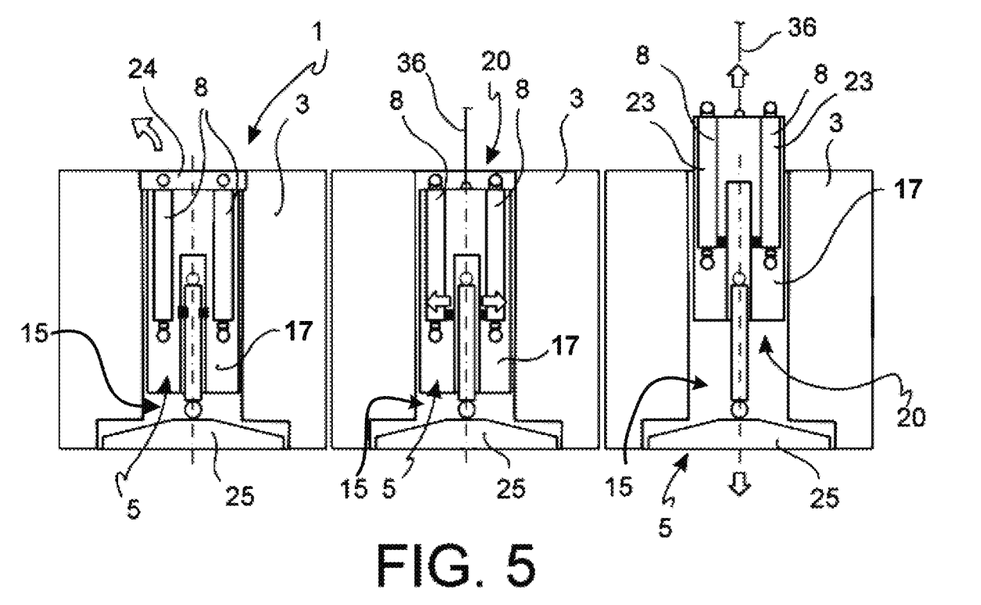
FIG. 5 shows three different steps of servicing of an extendable support, the first in retracted position, the second supported by a suspension cable and free from the supporting bracket during the step of releasing the leg foot and finally during the lifting of the leg body through the deck of the floating vessel, together with the extraction of the leg foot.
Figure 6:
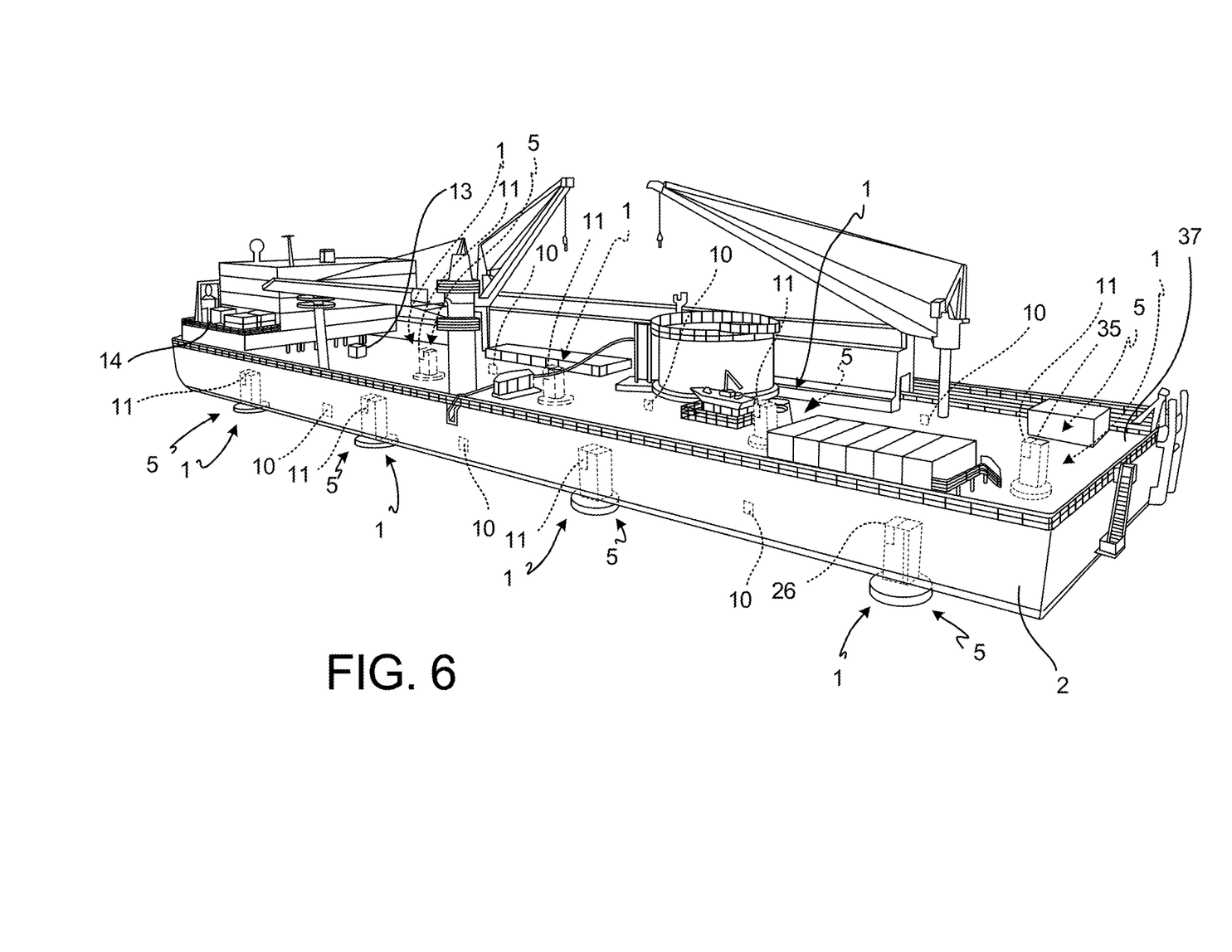
FIG. 6 shows a perspective view of a floating vessel with a dashed line in which the supporting system is highlighted with the control circuit, actuation and control diagrammatically shown.
Figure 7:
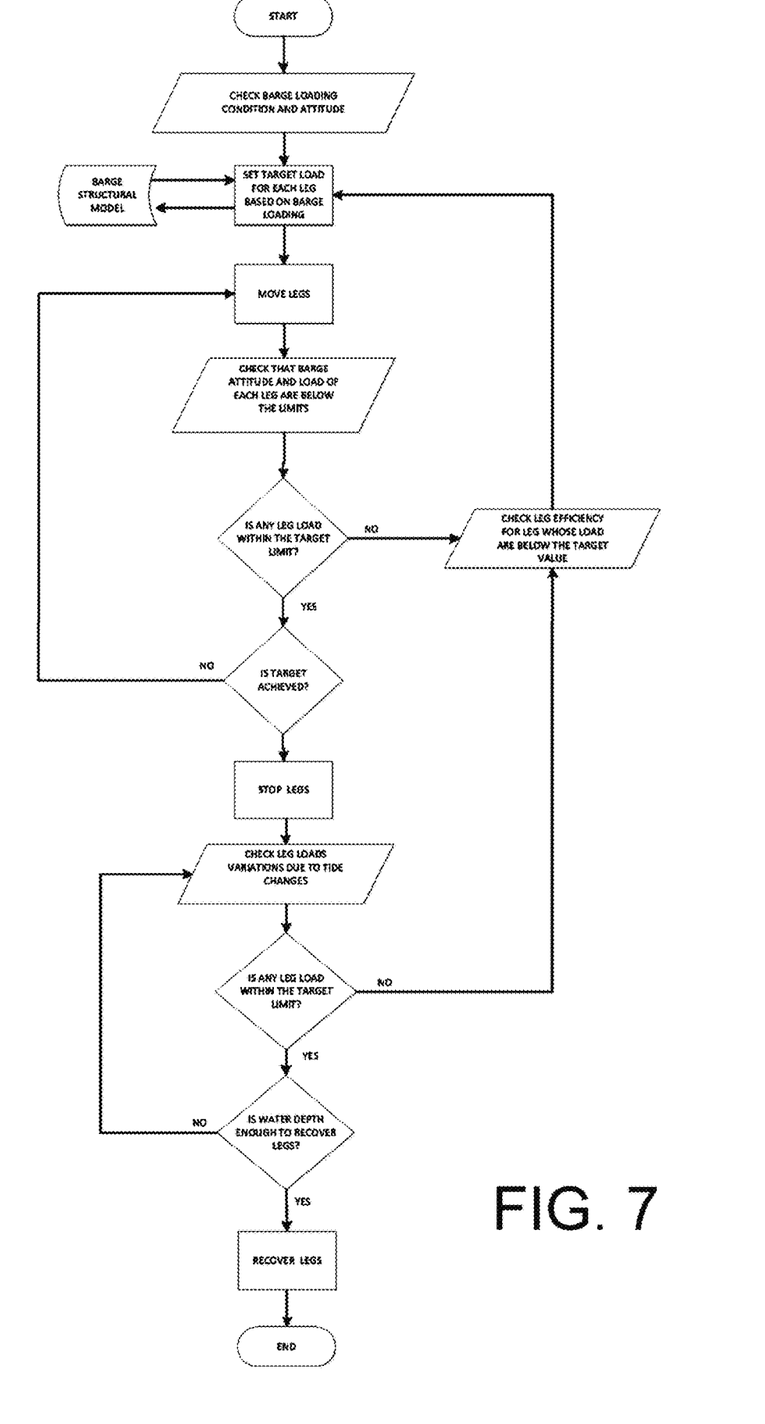
FIG. 7 shows a flow chart of the main steps of management and control of the supporting system.
Figure 7A:
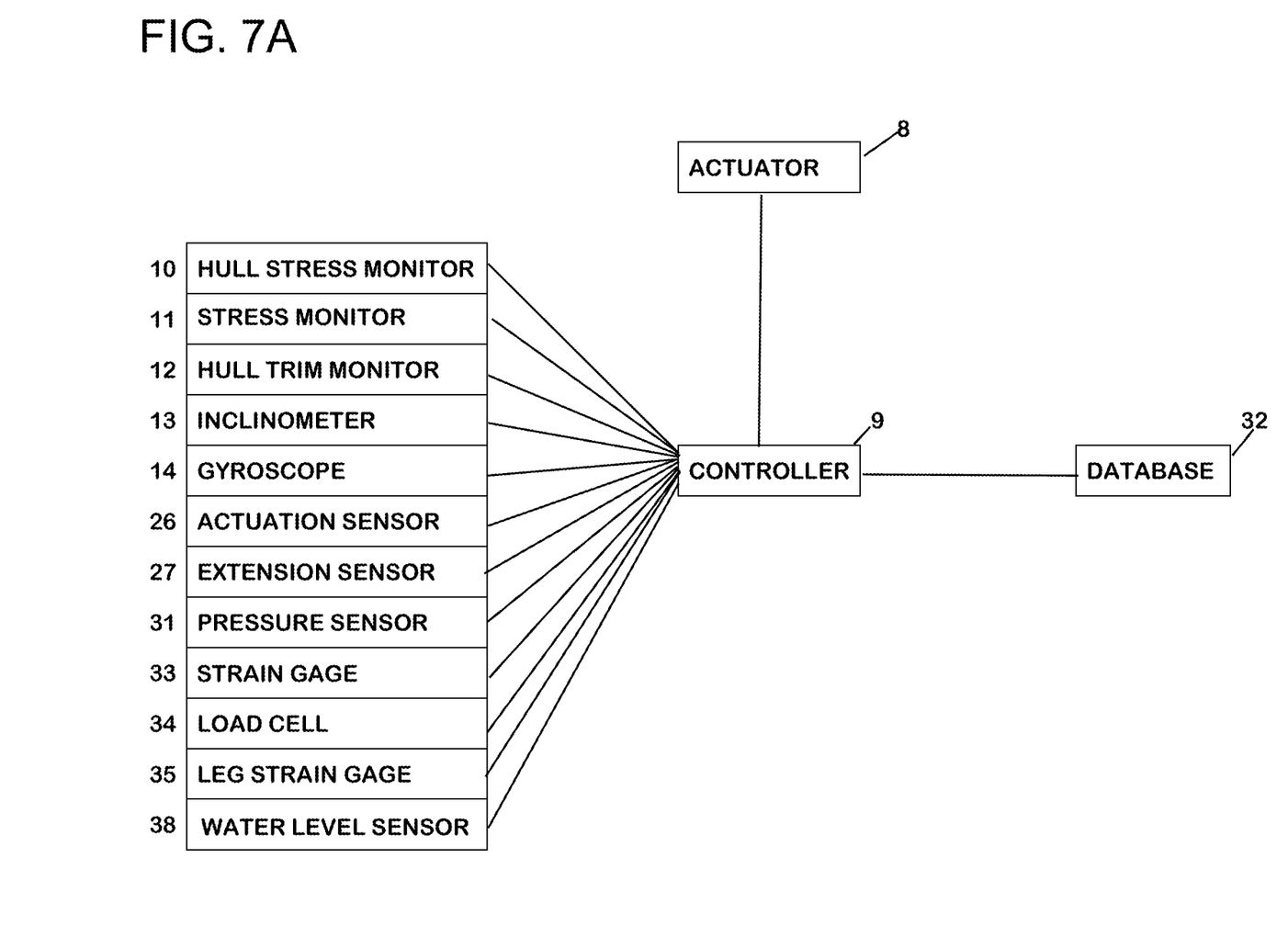
FIG. 7A shows a diagram of the control system for the supporting system.
Figure 8:
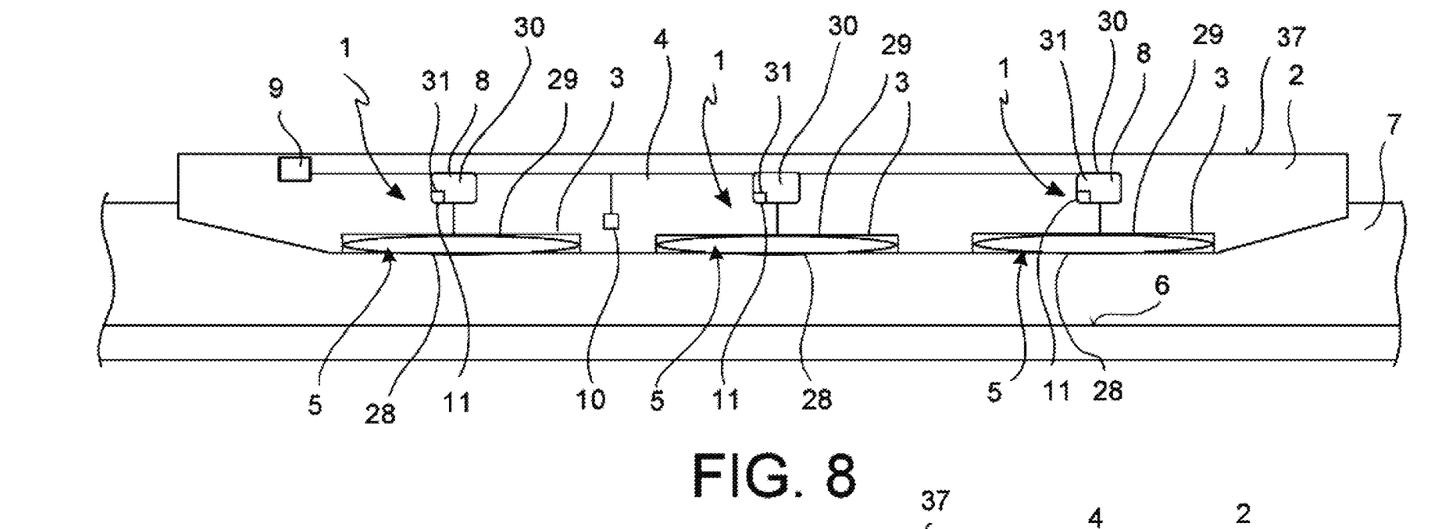
FIG. 8 shows a partial section side view of a floating vessel provided with a support according to a further embodiment and a first step in which the vessel is floating on the surface of the water body.
Figure 9:
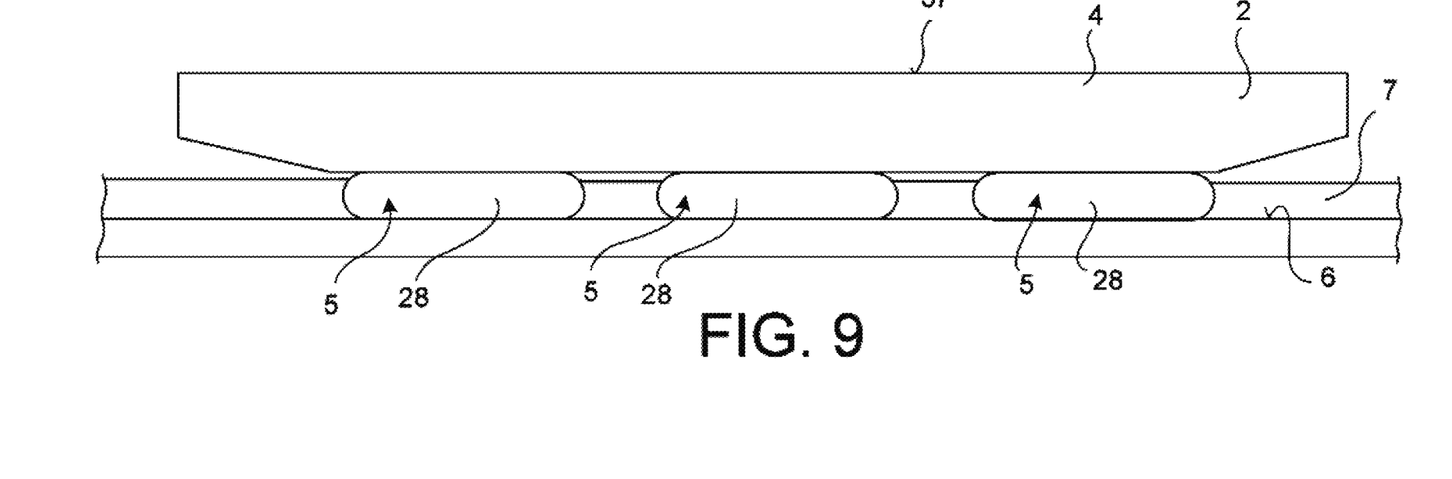
FIG. 9 shows a side view of the vessel in FIG. 8 in a second position in which the water body has a shallower depth with respect to FIG. 8, and the vessel rests on the bottom of the water body by extensible supports.

With reference to figures and according to a general embodiment, a supporting system 1 for a floating vessel 2, e.g. suitable for shallow or very shallow bottoms, comprises a support structure 3 envisaged in its hull 4. Said system further comprises at least one extendable support 5. Said at least one extendable support 5 is operatively connected to said support structures 3 so as to support part of the weight of the floating vessel 2 and of the load 16 arranged on said hull when supported by said at least one extendable support 5 and when said at least one extendable support 5 rests on a bed 6 of a water body 7, e.g. a sea bottom.

Said system further comprises at least one actuator 8 connected to said support structure 3 and is operatively connected to said at least one extendable support 5 for the extension of the extendable support 5 or its contraction or retraction.

Said assembly further comprises at least one controller 9 operatively connected to the actuator 8 to control the extraction or retraction movement of said at least one extendable support 5.

Advantageously, said system 1 further comprises at least one stress monitor present in the hull or hull stress monitor 10, operatively connected to said at least one controller 9.

As additional advantage, said system further comprises at least one device to monitor the stress, or load, on the at least one extendable support 5, said stress monitor is indicated in the accompanying figures with reference numeral 11 and is operatively connected to said at least one controller 9.

According to an embodiment, said system comprises at least one hull trim monitor 12 for monitoring the trim of the hull of the floating vessel 2. Said hull trim monitor 12 is operatively connected to said at least one controller 9. For example, said at least one hull trim monitor 12 comprises at least one inclinometer 13 suitable to detect the pitching, rolling and yawing of said hull 4. According to an embodiment, said at least one hull trim monitor 12 comprises at least two inclinometers 13 suitable to detect at least the pitching or rolling of the hull 4. According to yet another embodiment, said at least one hull trim monitor 12 comprises at least one gyroscope 14 suitable to detect the pitching, rolling and yawing of said hull 4.

According to an embodiment, said portion of supporting structure 3 comprises more than three leg seats 15, e.g. adapted to be arranged in said hull 4 so as to distribute the weight of said hull 4 and the useful load 16 arranged on said hull, thus preventing any overstressing of each portion of structure of said hull 4. According to a further embodiment, said more than three leg seats 15 are suitable to be arranged in said hull 4 so as to distribute the weight of said hull 4 and the load 16 placed on said hull, thus preventing any overstressing of said portions of support structure 3. According to an embodiment, said more than three leg seats 15 are six leg seats 15, e.g. distributed uniformly in the hull of the floating vessel. According to an embodiment, said more than three leg seats 15 are eight leg seats 15, e.g. distributed uniformly in the structure of the hull of the floating vessel.

According to an embodiment, said more than three of more leg seats 15 are accommodated in said hull so as to remain in operating conditions either retracted or extended entirely under the deck so as to prevent cluttering of the surface of the deck. According to an embodiment, said more than three leg seats 15 emerge under the hull and, for example but not necessarily, said more than three leg seats 15 are closed on top on their end facing towards the deck by a supporting bracket 24, e.g. removable.

According to an embodiment, said extendable support 5 comprises more than three extendable legs 17, each accommodated in its leg seat 15. According to an embodiment, said more than three extendable legs 17 are six extendable legs 17 accommodated in respective leg seats 15. According to a further embodiment, said more than three extendable legs 17 are eight extendable legs 17 accommodated in their respective leg seats 15 and uniformly distributed in the hull of the floating vessel.

According to an embodiment, each pair of leg seats 15 and respective extendable leg 17 form a supporting brace 18 suitable to be installed in hulls 4 of floating vessels 2, e.g. already built and operating, allowing to retrofit the system 1, according to any one of the embodiments described, on existing floating vessels.

According to an embodiment, each pair of leg seats 15 and respective extendable leg 17 constitute a supporting brace 18 suitable to be installed in hulls 4 of floating vessels 2 so as to prevent cluttering of the deck 37 used for the load 16 of the floating vessel 2 both with the extendable leg 17 in the fully retracted position of the extendable leg 17 and in the fully extended position.

According to an embodiment, each pair of leg seats 15 and respective extendable leg 17 form a supporting brace 18 suitable to be installed in hulls 4 of floating vessels 2 so as to be always under the deck 37 intended for the load 16 of the floating vessel 2 in all conditions of use.

According to an embodiment, each of said more than three supporting braces 18 comprises seat walls 19 which delimit a well-shaped seat. Connected to said seat walls 19 are guiding elements 21 to guide the extendable leg 17. At least one actuator assembly, for example at least one cylinder-piston assembly 23, is arranged between at least one supporting bracket 24, detachably connected to said seat walls 19, and said extendable leg 17 to extend or retract said leg member to or from said seat walls 19. According to an embodiment, each of said more than three supporting braces 18 further comprises a leg foot 25 detachably connected to said extendable leg 17 and suitable to rest on the bed 6 or bottom, of the water body 7 distributing the load exerted by said extendable leg 17 on a wide surface.

According to an embodiment, each of said more than three supporting braces 18 further comprises an actuation sensor 26 for detecting the action exerted by the at least one actuator assembly. For example, a pressure sensor of the control medium of the cylinder-piston assembly 23 is arranged operatively connected to each supporting brace 18.

According to an embodiment, each of said more than three supporting braces 18 further comprises an extension sensor 27 to detect the position or travel or extension of said extendable leg 17. According to an embodiment, said support structure 3 and the corresponding extendable support 5 can be positioned in the hull so as to be integrated in the structure of the hull itself remaining within the clearance of the hull itself and avoiding resistances to navigation of the floating vessel 2 when the extendable support 5 is in retracted position. For example, according to an embodiment, the extendable support has a leg foot 25, which in retracted conditions is accommodated in a leg foot seat so that the bottom of said leg foot reconstructs the continuity of the outer surface of the hull 4.

According to a further embodiment, said at least one extendable support 5 comprises at least one inflatable device, e.g. an air cushion or airbag, or a water cushion, indicated hereinafter by reference numeral 28, connected to said support structure 3. Said support structure 3 comprises an airbag seat or a cushion seat 29 suitable to accommodate said cushion 28 when it is inflated or retracted condition and to rest the hull on said cushion 28 when the cushion is in inflated or extended condition and resting on the bed 6 of said water body 7. According to a further embodiment, said actuator 8 comprises at least one inflation device, e.g. a compressor, in case of air, or pump, in case of water, indicated in the figures with reference numeral 30, suitable to inflate said at least one cushion 28. According to an embodiment, said at least one stress monitor 11 for monitoring the stress, or load, on the at least one extendable support 5 comprises at least one pressure sensor 31 suitable to measure the pressure in said cushion 28.

According to an embodiment, said at least one controller 9 is provided with feedback from the hull stress monitor 10, e.g. to define the entity of the load applicable to the at least one extendable support 5 which does not produce an undesired stress on the hull.

The expression "feedback from the device" means the feedback of the signal produced by the device and proportional to the quantity detected thereby.

According to an embodiment, said at least one controller 9 is provided with feedback from the stress monitor 11 of the at least one extendable support 5, so as, for example, to interrupt the control of the actuator when a predetermined stress or load value is reached.

According to an embodiment, said at least one controller 9 is provided with feedback from the hull trim monitor 12, so as to extend the extendable support seeking the desired trim of the hull, e.g. so as to keep the deck of the hull either horizontal or parallel to the theoretical free water surface, mediating the swell of the water body, or again to arrange the barge at a predetermined distance from the bed of the water body.

According to an embodiment, said at least one controller 9 is provided with feedback from an extension sensor 27 for monitoring the extension of the extendable support 5, so as for example to interrupt the extension control when a predetermined travel value is reached or, for example, to compare the extensions of different extendable supports and limit the differences of travel between these supports.

According to an embodiment, said system 1 further comprises a water level sensor 38 for measuring the water level in the water body, suitable to verify the floatability of the floating unit according to the draft of its hull. According to an embodiment, said at least one controller 9 is operatively connected to said water level sensor 38 for measuring the water level, so as to extend the at least one extendable support 5 if the water level falls below a minimum value that would cause the hull 4 of the floating vessel 2 to touch the bottom or bed 6 of the water body 7.

According to an embodiment, said hull stress monitor 10 comprises a database 32 which correlates at least two of the following values:
 a predefined stress on the hull 4 in predefined sections or points of said hull;
 a predefined load value for each extendable support 5;
 a predefined extension or travel value for each extendable support 5;
 a predefined value for the angle of trim of the hull 4;
 a predefined load value 16.

According to an embodiment, said hull stress monitor 10 comprises a database containing for each predefined stress on the hull 4 evaluated in predefined sections or points of the hull itself, at least one maximum load value for each extendable support 5 and/or at least one extension limit value of each extendable support 5; and/or at least one maximum value for the angle of trim of the hull; and/or at least one maximum value for the useful load 16.

According to an embodiment, said hull stress monitor 10 comprises a structural model of the hull 4 so that each predefined stress on the hull 4 evaluated at sections or points of said hull defines a predefined load value for each extendable support 5; and/or a predefined value for the extension, or travel, of each extendable support 5; and/or a predefined value for the angle of trim of the hull 4; and/or a predefined value for the load 16.

According to a further embodiment, said hull stress monitor 10 comprises a structural model of the hull 4 which for each predefined load value of each extendable support 5 defines a predefined stress value of the hull 4, evaluated at sections or points of the hull itself; and/or a predefined value for the extension, or travel, of each extendable support 5; and/or a predefined value for the angle of trim of the hull 4; and/or a predefined value for the load 16.

According to an embodiment, said hull stress monitor 10 comprises at least one stress sensor, for example a strain gage 33, arranged in the structure of the hull arranged in predefined sections or at predefined points of the hull 4, e.g. the theoretical points of maximum stress of the hull structure 4.

According to an embodiment, said stress monitor 11 for monitoring stress, or load, on the at least one extendable support comprises a load cell 34 suitable to measure the load applied to each extendable support 5. According to an embodiment, said stress monitor 11 for monitoring stress, or load, on the at least one extendable support comprises a stress sensor, for example a leg strain gage 35 arranged in the structure of the extendable support 5.

The present invention relates also to a floating vessel 2 comprising at least one assembly 1 as defined in any one of the embodiments described above.

For example, the present invention relates to a floating vessel 2, which comprises a barge for low or very low water, e.g. a barge of considerable longitudinal and transverse extension, e.g. a barge suitable to install cables or wires or to bury them.

A method for supporting a floating vessel 2 on the bed 6 of a water body 7 will be described below.

Said method, according to a general embodiment, comprises the steps of:
providing a system 1 having at least one supporting structure 3, e.g. having more than three support structures 3 and having at least one corresponding extendable support 5, e.g. having more than three corresponding extendable supports 5;
defining a load to apply to each extendable support 5 as a function of a predefined maximum stress on the hull calculated or predefined in a predefined section or point of the structure of the hull of the floating vessel 2;
controlling the extension, or retraction, of said extendable supports 5 so as to apply the defined load for each extendable support 5;
measuring the load applied to each extendable support 5;
checking that the load applied to each extendable support 5 is less than a predefined maximum value.

Further embodiments of the supporting method will be described below.

For example, a further supporting method comprises the further steps of:
defining a load to be applied to each extendable support 5 also considering the load 16.

According to a further embodiment of the method, the following steps are provided:
defining a load to be applied to each extendable support 5 also taking into account the trim of the hull 4 of the floating vessel 2.

According to a further embodiment of the method, the following steps are provided:
providing with feedback the extension control of said extendable supports 5 based on the measurement of the load applied to each extendable support 5.

According to a further embodiment of the method, the following steps are provided:
providing with feedback the extension control of said extendable supports 5 based on the calculation of the trim of the hull 4.

According to a further embodiment of the method, the following steps are provided:
interrupting the extension of the extendable supports 5 upon reaching the defined load and/or a predefined maximum load for each extendable support 5.

According to a further embodiment of the method, the following steps are provided:
checking the load applied to each extendable support 5 at any change in floating conditions, or absence of floating, of the floating vessel 2 and if the value of the load applied to each extendable support 5 exceeds a predefined maximum load value for each extendable support 5, redefining a new load to be applied to said extendable support 5 and controlling the extension, or retraction, of said extendable support 5 so as to apply the newly defined load to each extendable support 5.

According to a further embodiment of the method, the following steps are provided:
checking whether the level of the water body 7 is above the maximum limit extension which can be reached by said extendable support 5 and retracting said extendable support 5.

According to a further embodiment of the method, the following steps are provided:
checking whether the level of the water body 7 is below a predefined maximum limit for the correct floating of the floating vessel 2 and extending said extendable support 5.

Hereinafter, a method of servicing of a system 1 as defined in any one of the embodiments described above is described. Said method comprises the steps of:
raising at least one of said supporting braces 18 and removing it from the respective leg seat 15 even with the floating vessel 2 in use.

According to a further embodiment of the method, the following steps are comprised:
hooking a hoisting device 36 to the extendable leg 17;
disconnecting the cylinder-piston assembly 23 from the supporting bracket 24;
removing the supporting bracket 24 from the well-shaped seat 20;
disconnecting the leg foot 25 from the extendable leg 17;
removing the extendable leg 17 from the well-shaped seat 20 and lifting it onto the deck 37.

A method for reconfiguring a floating vessel 2 will be described below. Said method comprises the steps of:
providing at least one support structure 3 in the hull 4 of the floating vessel 2;
connecting at least one system as described in any one of the claims described above to said support structure 3.

A person skilled in the art may make many changes, adaptations and replacements to the embodiments described above or can replace elements with others which are functionally equivalent in order to satisfy contingent needs without however departing from the scope of protection of the appended claims.

By virtue of the solutions described above, the extendable support 5 will be driven limitedly inside the bed of the water body, e.g. by a few meters and consequently the necessary further excursion length of each extendable support 5 will be advantageously comparable, thus also by a few meters.

REFERENCES

1 system
2 floating vessel
3 portion of support structure
4 hull
5 extendable support
6 bed
7 water body
8 actuator
9 controller
10 hull stress monitor
11 stress monitor to monitor the stress, or load, on the at least one extendable support
12 hull trim monitor
13 inclinometer
14 gyroscope
15 leg seats
16 load or useful load or service load
17 extendable leg
18 supporting braces
19 seat walls
20 well-shaped seat
21 guiding elements
23 cylinder-piston assembly
24 supporting bracket
25 leg foot
26 actuation sensor
27 extension sensor
28 airbag or cushion
29 cushion seat
30 compressor
31 pressure sensor
32 database
33 strain gage
34 load cell
35 leg strain gage
36 hoisting device
37 deck
38 sensor

The invention claimed is:

1. A supporting system for a floating vessel including a hull; the supporting system comprising:
   a support structure for the hull of said floating vessel;
   an extendable support connected to said support structure and partially supporting the floating vessel when supported by said extendable support and when said extendable support rests on a bed of a body of water;
   an actuator connected to said support structure and connected to said extendable support for extension or retraction of said extendable support;
   a controller connected to said actuator to control the extension or retraction of said extendable support;
   a hull stress monitor connected to said controller; and
   a stress monitor for monitoring stress on the extendable support connected to said controller;
   a water level sensor for measuring water level in the body of water connected to the controller; said controller being operatively connected to said water level sensor for measuring the water level to extend the extendable support if a sensed water level falls below a minimum value that would cause the hull to touch the bed of the water body;
   wherein said extendable support comprises at least two pairs of extendable legs;
   wherein said support structure comprises at least two pairs of leg seats;
   wherein said at least two pairs of leg seats are arranged in said hull to distribute weight of said floating vessel;
   wherein each leg seat and a corresponding extendable leg comprises a supporting brace installed in said hull both with the extendable leg in a fully retracted position and in a fully extended position;
   wherein each of said supporting braces comprises:
      seat walls delimiting a seat;
      a guide for guiding an extendable leg;
      an actuator assembly comprising a cylinder-piston assembly, arranged between a supporting bracket, detachably connected to said seat walls and to said extendable leg to extend or retract said extendable leg;
      a leg foot detachably connected to said extendable leg and resting on the bed of the body of water distributing stress applied by said extendable leg;
      an actuation sensor to detect action exerted by the actuator assembly, the actuation sensor comprising a pressure sensor of the cylinder-piston assembly; and
      an extension sensor to detect position or travel or extension of said extendable leg;
   wherein said support structure and a corresponding extendable support are in the hull and within a profile of the hull.

2. The supporting system for a floating vessel as claimed in claim 1, further comprising:
   a hull trim monitor for monitoring trim of the hull of said floating vessel connected to said controller;
   wherein said hull trim monitor comprises a gyroscope to detect pitching, rolling and yawing of said hull.

3. The supporting system for a floating vessel as claimed in claim 1, wherein:
   said extendable support comprises a cushion connected to said support structure comprising a cushion seat to accommodate said cushion when in a deflated condition and to rest the hull upon said cushion when the cushion is in an inflated condition and resting on the bed of the body of water; wherein
   said actuator comprises a compressor to inflate said cushion; wherein
   said stress monitor comprises a pressure sensor to measure pressure in said cushion.

4. The supporting system for a floating vessel as claimed in claim 1,
   wherein said controller is provided with a signal from the hull stress monitor;
   wherein said controller is provided with a signal from the stress monitor;
   wherein said controller is provided with a signal from a hull trim monitor.

5. The supporting system for a floating vessel as claimed in claim 1, further comprising:
a database accessed by the hull stress monitor, the database correlating at least two of the following values:
a predefined stress on the hull in predefined sections or points of said hull;
a predefined extension or travel value for the extendable support;
a predefined value for an angle of trim of the hull.

6. The supporting system for a floating vessel as claimed in claim 1, comprising a barge.

7. The supporting system for a floating vessel as claimed in claim 1,
wherein said more than three leg seats are six leg seats, and
wherein said more than three extendable legs are six extendable legs; or
wherein said more than three leg seats are eight leg seats, and
wherein said more than three extendable legs are eight extendable legs.

8. The supporting system for a floating vessel as claimed in claim 1,
wherein said supporting system for a floating vessel further comprises a sensor for measuring water level in the body of water, to verify floatability of the floating vessel based on draft of the floating vessel; wherein
said controller is connected to said sensor for measuring water level, so as to extend the extendable support if water level falls to below a minimum value that would cause the hull of the floating vessel to touch the bed of the body of water.

9. The supporting system for a floating vessel as claimed in claim 1, further comprising
a database accessed by the hull stress monitor, the database containing for each predefined stress on the hull in predefined sections or points of said hull, a maximum load value for the extendable support; or a maximum value for extension of the extendable support; or a maximum value for the angle of trim of the hull; or a maximum value for the predefined load value; and/or
a structural model of the hull accessed by the hull stress monitor, wherein the structural model for each predefined stress on the hull at sections or points of said hull defines a predefined load value for the extendable support; or a predefined value for the extension, or travel, of the extendable support; or a predefined value for the angle of trim of the hull; or a predefined value for the predefined load value; and/or
wherein said hull stress monitor comprises a stress sensor comprising a strain gage, arranged in the hull in predefined sections or at predefined points of the hull; and/or
wherein said sensor for monitoring stress on the extendable support comprises a load cell to measure the stress applied to the extendable support; and/or
wherein said sensor for monitoring stress on the extendable support comprises a stress sensor comprising a leg strain gage arranged in the extendable support.

10. Method for reconfiguring a floating vessel comprising:
the supporting system as claimed in claim 1;
configuring said support structure to fit within the hull of said floating vessel.

11. Method for supporting a floating vessel on a bed of a body of water, the floating vessel having a hull and a deck, the method comprising:
providing a system having more than three support structures and more than three corresponding extendable supports, wherein said support structures and the corresponding extendable supports are within the hull and within a profile of the hull, and wherein said extendable supports extend or retract within the hull entirely under the deck of said floating vessel;
defining a stress to apply to each of the extendable supports as a function of a predefined maximum stress on a hull calculated or predefined in a predefined section or point of the hull of the floating vessel;
controlling extension, or retraction, of said extendable supports to apply the stress defined for each of the extendable supports;
measuring stress applied to each of the extendable supports;
checking that the stress applied to each of the extendable supports is less than a predefined maximum value;
measuring a water level of the body of water; and
checking stress applied to each of said extendable supports at a change in the water level of the body of water; wherein if a value of the stress applied to each of the extendable supports exceeds a predetermined maximum stress value for each of the extendable supports, applying a new stress to each of said extendable supports and controlling the extension or retraction of said extendable supports.

12. Method as claimed in claim 11, further comprising:
defining a stress applied to each of the extendable supports based on trim of the hull of the floating vessel; or
controlling the extension of said extendable supports based on a measurement of the stress applied to each of the extendable supports; or
controlling the extension of said extendable supports based on a calculation of the trim of the hull; or
stopping the extension of the extendable supports upon reaching the stress defined or a predefined maximum stress for each of the extendable supports; or
checking the stress applied to each of the extendable supports at a change in the water level of the body of water; and if a value of the stress applied to each of the extendable supports exceeds a predefined maximum stress value for each of the extendable supports, applying a new stress to said extendable supports and controlling the extension, or retraction, of said extendable supports to apply the newly defined stress to each of the extendable supports; or
extending said extendable supports.

13. The method as claimed in claim 11, wherein if the water level is below a predefined maximum limit, the method further comprises extending the extendable support.

14. A floating vessel comprising:
a hull;
a supporting system, the supporting system comprising:
a support structure in the hull of said floating vessel;
an extendable support connected to said support structure and partially supporting the floating vessel when supported by said extendable support and when said extendable support rests on a bed of a body of water;
an actuator connected to said support structure and connected to said extendable support for extension or retraction of said extendable support;
a controller connected to said actuator to control the extension or retraction of said extendable support;
a hull stress monitor connected to said controller;
a stress monitor for monitoring stress on the extendable support connected to said controller; and a water level sensor for measuring a water level in a body of water operatively connected to said controller to extend the extendable support if the water level falls below a minimum value that would cause the hull to touch the bed of the water body;

wherein said extendable support comprises more than three extendable legs;

wherein said support structure comprises more than three leg seats;

wherein said more than three leg seats are arranged in said hull to distribute weight of said floating vessel;

wherein each leg seat and a corresponding extendable leg comprises a supporting brace installed in said hull both with the extendable leg in a fully retracted position and in a fully extended position;

wherein each of said supporting braces comprises:
  seat walls delimiting a seat;
  a guide for guiding an extendable leg;
  an actuator assembly comprising a cylinder-piston assembly, arranged between a supporting bracket, detachably connected to said seat walls and to said extendable leg to extend or retract said extendable leg;
  a leg foot detachably connected to said extendable leg and resting on the bed of the body of water distributing stress applied by said extendable leg;
  an actuation sensor to detect action exerted by the actuator assembly, the actuation sensor comprising a pressure sensor of the cylinder-piston assembly; and
  an extension sensor to detect position or travel or extension of said extendable leg;

wherein said support structure and a corresponding extendable support are in the hull and within a profile of the hull.

* * * * *